June 10, 1958
R. H. COUSTILLAC
2,838,323
STEERING BRAKE FOR A FOUR WHEELED TRAILING VEHICLE
Filed Aug. 13, 1954
2 Sheets-Sheet 1
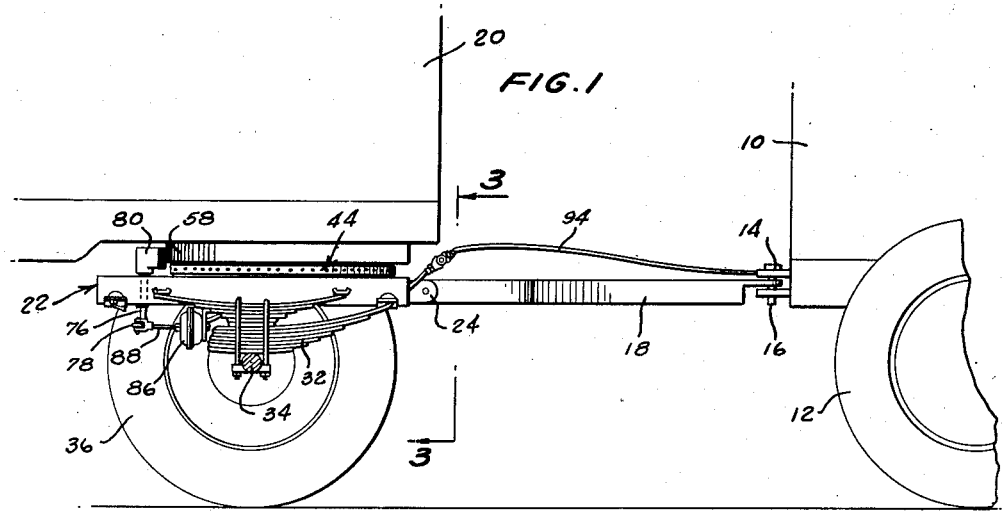
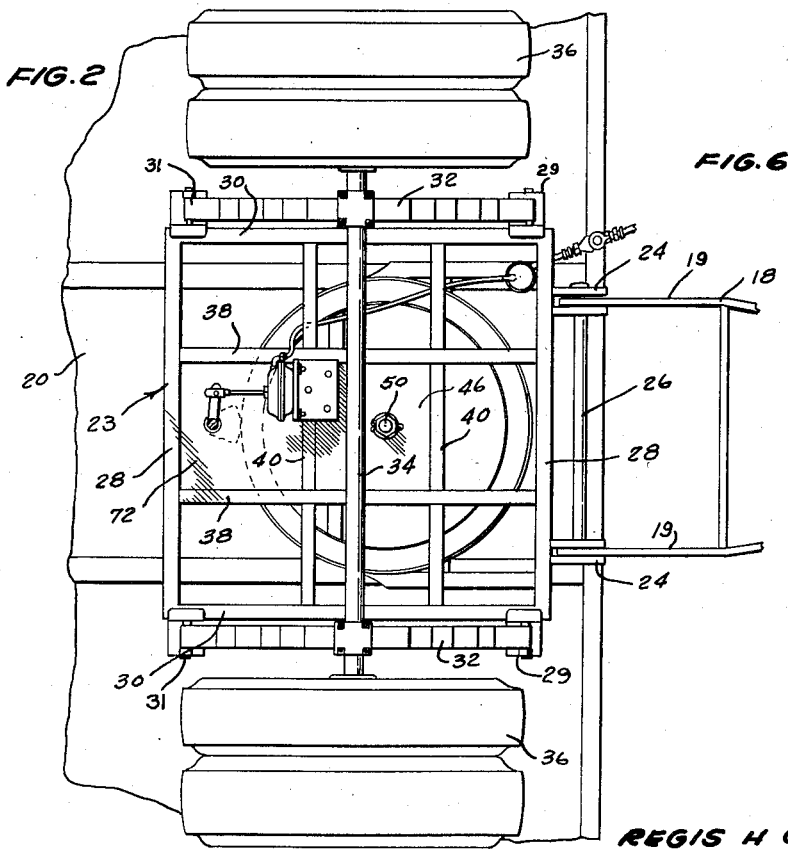
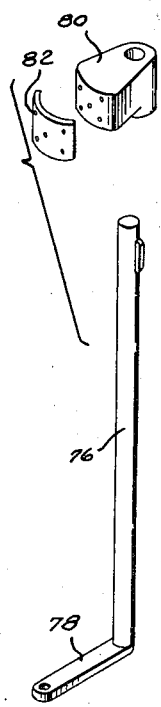
INVENTOR
*REGIS H COUSTILLAC*
BY
*McMorrow, Berman + Davidson*
ATTORNEYS June 10, 1958 R. H. COUSTILLAC 2,838,323
STEERING BRAKE FOR A FOUR WHEELED TRAILING VEHICLE
Filed Aug. 13, 1954 2 Sheets-Sheet 2
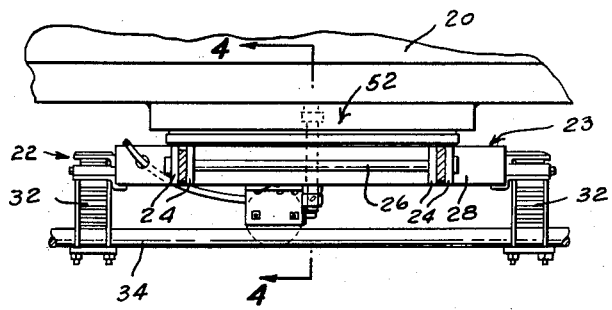
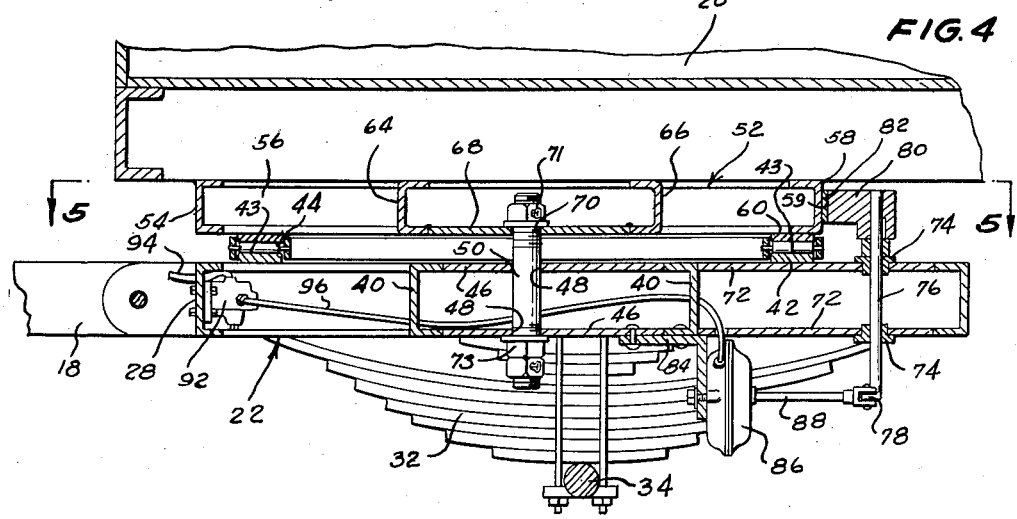
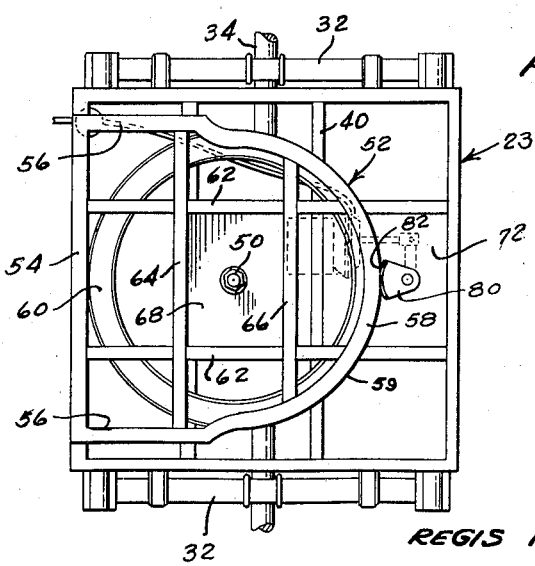
INVENTOR
REGIS H. COUSTILLAC
BY
McMorrow, Berman + Davidson
ATTORNEYS United States Patent Office 2,838,323
Patented June 10, 1958

2,838,323

STEERING BRAKE FOR A FOUR WHEELED TRAILING VEHICLE

Regis H. Coustillac, Youngstown, Ohio

Application August 13, 1954, Serial No. 449,642

2 Claims. (Cl. 280—116)

This invention relates to an improved steering brake mechanism for the front steerable truck of a trailer vehicle, the mechanism being controllable by the operator of a tractor connected to the trailer for determining and maintaining the angle of the front truck relative to the longitudinal axis of the trailer vehicle, and preventing jack-knifing of the trailer vehicle in a backing operation.

The primary object of the invention is to provide a steerable front truck for a trailer, involving steering brake mechanism therefor which is of a simplified, more efficient, and more reliable structure, and which can be made in a serviceable and rugged form at relatively low cost.

Other important objects and advantageous features of the invention will be apparent from the following description and the accompanying drawings, wherein, for purposes of illustration only, a specific form of the invention is set forth in detail.

In the drawings:

Figure 1 is a fragmentary side view showing a tractor vehicle coupled to a trailer having a front steerable truck and truck braking means in accordance with the present invention;

Figure 2 is an enlarged fragmentary bottom plan view of the front steerable truck structure of the trailer;

Figure 3 is an enlarged fragmentary sectional view taken substantially on the line 3—3 of Figure 1;

Figure 4 is a fragmentary further enlarged sectional view taken substantially on the line 4—4 of Figure 3;

Figure 5 is a horizontal sectional view on a reduced scale taken substantially on the line 5—5 of Figure 4, and Figure 6 is an exploded perspective view of the braking cam structure.

Referring to the drawings in detail, a tractor vehicle 10 is provided with traction wheels 12 and with vertically spaced ears 14 which project rearwardly from the rear end of the tractor vehicle and are provided with vertically aligned openings for the reception of a coupling pin 16 by means of which the draft tongue 18 of a trailer 20 is connected to the tractor 10. The tractor 10 is also provided with a cab (not shown) which comprises the operator's station of the tractor-trailer train.

The trailer 20 has a front steerable truck 22 comprising a rectangular horizontal frame 23 having front and rear cross members 28 and side members 30. The side members 30 have thereon front and rear shackles 29 and 31, respectively, mounting leaf springs 32 of conventional form which are secured upon a transversely extending dead axle 34 on whose ends are mounted front truck wheels 36. Longitudinally extending brace bars 38 are fixed to the end cross members 28 and extend therebetween, and transversely extending brace bars 40 are fixed to the side members 30 and extend therebetween to define a grid on which is supported the lower race 42 of a conventional anti-friction roller bearing designated generally 44. Vertically spaced plates 46 are carried by the grid defined by the bars 38 and 40 and extend between the bars intermediate opposite ends thereof as will be readily understood upon reference to Figure 4. The plates 46 are provided with vertically aligned openings 48 through which is extended a kingpin 50 about which the truck 22 turns relative to the trailer 20. The rotary bearing means 44 surrounds the kingpin 50, and comprises the lower annular race 42 fixed on and rising from the truck frame 23, an upper annular race 60 fixed on and depending from the trailer frame 52 concentric with the lower race 42, and anti-friction means 43 operatively connecting the upper and lower races 60 and 42 respectively. Projecting forwardly from the truck frame front cross member 28 is a pair of spaced ears 24 traversed by a coupling shaft 26 on which are pivoted the rear ends of side bars 19 of the draft tongue 18.

Secured to the underside of the trailer 20 adjacent the forward end thereof and extending downwardly therefrom is a frame designated generally 52 which comprises a rear cross member 54 to opposite ends of which are connected spaced parallel side members 56, the forward ends of which are joined to opposite ends of an arcuate brake bar 58 which is concentric to the axis of the king pin 50. The lower side of the arcuate brake bar 58 rests on the upper race 60 of the anti-friction roller bearing 44. Fixed to opposite sides of the brake bar and to the cross member 54 are longitudinally extending brace bars 62. Transversely extending brace bars 64 and 66 are fixed to and extend between the side members 56 and opposite sides of the brake bar. Fixed on the bars 62, 64 and 66 and extending therebetween adjacent the lower edges thereof is a plate 68 having an opening 70 extending vertically therethrough through which extends the upper end of the kingpin 50 as will be readily understood upon reference to Figure 4. Nuts 71 and 73 on the upper and lower ends of the king pin 50 bear upon the upper surface of the plate 68 and the underside of the lower plate 46, respectively.

The plates 46 have rearward extensions 72 connected to the rearmost cross member 28 of the truck frame 23 and the rearmost brace bar 40 thereof, and mounted in the extensions 72 in vertical alignment are bearing bushings 74 in which is journaled a brake shaft 76. The brake shaft 76 carries adjacent its lower end a laterally extending arm 78, and fixed on the upper end of the shaft is a cam 80 carrying a brakeshoe 82 which when the cam is turned in one direction contacts the convex rear braking surface 59 of the brake bar 58 to arrest turning movement of the truck 22 about the vertical axis of the kingpin 50.

Secured to the underside of the forward brace bar 40 of the truck frame 23, and extending downwardly therefrom is an angle bracket 84 on which is mounted a conventional fluid brake cylinder 86 having a piston rod 88 which is pivotally connected to the arm 78 of the brake shaft 76 so that as the piston rod 88 is moved upon the introduction of fluid into the cylinder 86, the brake shaft 76 will be rotated about its vertical axis to move the brake shoe 82 into braking engagement with the braking surface 59. A suitable flexible conduit 96 is connected to the brake cylinder 86 and to a relay valve 92 carried by the front cross member 28 of truck frame 23, and detachably connected to the relay valve 92 and leading forwardly therefrom into the cab of the tractor 10 to which the trailer 20 is connected is a pipe 94 which is connected to a control valve (not shown) mounted in the cab of the trailer adjacent the operator's station. It will thus be seen that by operating the remote control valve within the tractor cab, the relay valve may be so controlled as to supply fluid under pressure to the cylinder 86 and cause the piston rod 88 to rotate the brake shaft 76 to engage the brake shoe 82 with the braking surface 59 and thereby lock the truck 22 against rotation about the kingpin 50 and the truck wheels 36 at a selected angle relative to the longitudinal axis of the trailer 20.

In use it will be evident that the operator of the tractor 10 can by manipulation of a remote control valve set the trailer truck wheels 36 at a selected angle relative to the longitudinal axis of the trailer and enable the trailer to be backed in a selected path, and jack-knifing of the trailer during the backing operation will be avoided.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a steerable front truck for a trailer, a steerable wheeled horizontal truck frame having front and rear ends and opposite sides, a relatively stationary horizontal trailer frame adapted to be fixed to a trailer and overlying said truck frame, a vertical king pin traversing and secured to said truck and trailer frames, rotary bearing means surrounding said king pin and supportably interposed between said truck and trailer frame, said trailer frame having a rear end comprising an arcuate brake bar concentric with the king pin, said brake bar having a convex rear side providing a braking surface, a vertical brake shaft journaled through said truck frame and having an upper end above said truck frame, said brake shaft being located rearwardly of said trailer frame brake bar and spaced from the opposite sides of the truck frame, a brake cam fixed on the upper end of the brake shaft having a brake shoe arranged to brakingly contact the braking surface of the brake bar upon rotation of said brake shaft, and actuating means on said truck frame operatively connected to the brake shaft.

2. In a steerable front truck for a trailer, a steerable wheeled horizontal truck frame having front and rear ends and opposite sides, a relatively stationary horizontal trailer frame adapted to be fixed to a trailer and overlying said truck frame, a vertical king pin traversing and secured to said truck and trailer frames, rotary bearing means surrounding said king pin and supportably interposed between said truck and trailer frame, said trailer frame having a rear end comprising an arcuate brake bar concentric with the king pin, said brake bar having a convex rear side providing a braking surface, a vertical brake shaft journaled through said truck frame and having an upper end above said truck frame, said brake shaft being located rearwardly of said trailer frame brake bar and spaced from the opposite sides of the truck frame, a brake cam fixed on the upper end of the brake shaft having a brake shoe arranged to brakingly contact the braking surface of the brake bar upon rotation of said brake shaft, and actuating means on said truck frame operatively connected to the brake shaft, said rotary bearing means comprising a lower annular race fixed on and rising from the truck frame, an upper annular race fixed on and depending from the trailer frame concentric with the lower race, and anti-friction means operatively connecting the upper and lower races.

References Cited in the file of this patent

UNITED STATES PATENTS

| | | |
|---|---|---|
| 1,040,515 | Cooper | Oct. 8, 1912 |
| 1,078,801 | Munsing | Nov. 18, 1913 |
| 2,389,424 | De Cardy | Nov. 20, 1945 |
| 2,605,114 | Ronning | July 29, 1952 |
| 2,613,946 | Anderson | Oct. 14, 1952 |
| 2,667,364 | Colpo | Jan. 26, 1954 |
| 2,764,424 | Standing | Sept. 25, 1956 |

FOREIGN PATENTS

| | | |
|---|---|---|
| 223,635 | Great Britain | Oct. 30, 1924 |